UNITED STATES PATENT OFFICE.

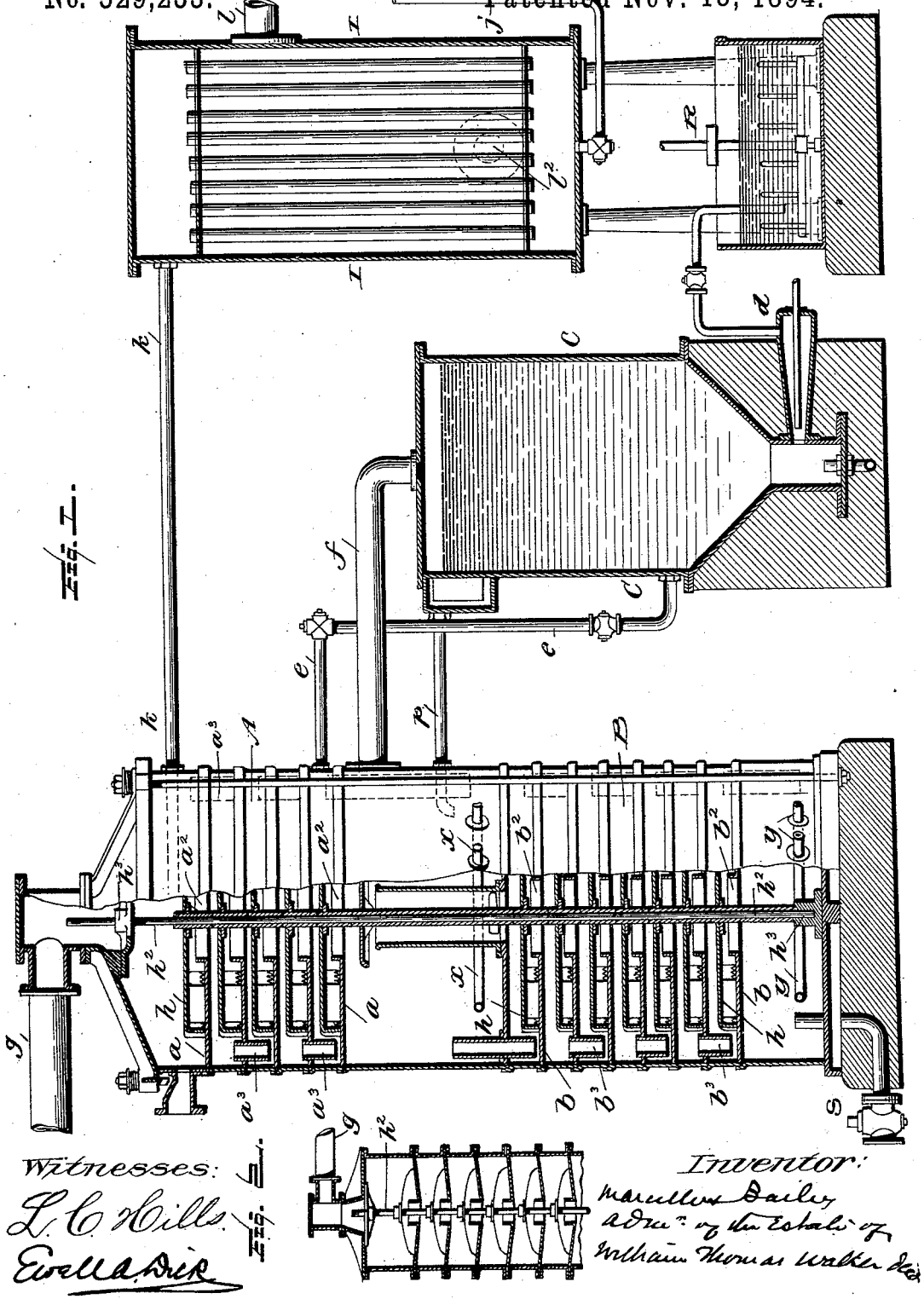

MARCELLUS BAILEY, OF WASHINGTON, DISTRICT OF COLUMBIA, ADMINISTRATOR OF WILLIAM THOMAS WALKER, DECEASED.

APPARATUS FOR DRIVING OFF VOLATILE CONSTITUENTS FROM LIQUIDS.

SPECIFICATION forming part of Letters Patent No. 529,233, dated November 13, 1894.

Application filed December 21, 1893. Serial No. 494,309. (No model.) Patented in England December 6, 1887, No. 16,806.

*To all whom it may concern:*

Be it known that WILLIAM THOMAS WALKER, deceased, a British subject, late of Bishopswood, Highgate, in the county of Middlesex, England, did in his life-time invent a new and Improved Apparatus to be Used in Chemical Operations where it is Required to Drive Off from Liquids Volatile Constituents Thereof, (for which Letters Patent have been granted in Great Britain, dated December 6, 1887, No. 16,806,) of which the following is a specification.

This invention relates to apparatus wherein volatile products are driven off from liquors by means of steam coming into contact with the liquors first alone and afterward in the presence of an agent such for example as lime.

An especial application of apparatus constructed or arranged according to this invention is to the driving off from ammonical gas liquor, of ammonia for the purpose of producing sulphate of ammonia or concentrated liquor, but it is not limited thereto.

The objects of this invention are to provide apparatus which is very compact and occupies comparatively but little room to afford ready access to the parts and further to provide means for readily removing obstructions and for effecting a thorough action of the agent (such as lime) which is used in the process.

I will describe this invention with reference to the accompanying drawings representing in—

Figure 1 a vertical section of an apparatus constructed according to this invention. Fig. 2 is a like section of part of a column, representing a modified form of hood.

The apparatus consists of a first column A mounted upon and communicating with a second column B and a tank C in which the action of the agent (such as lime) is obtained. This tank C is preferably situated at the side of the second column, but it may be placed between the columns A and B. The tank C has opening into it, a steam injector $d$ by which the lime or other agent from the mixer R is injected; and by the pipe $e$ the liquor passes from the first column A and is discharged into the tank C so that the liquor and the lime or the like are caused to be agitated together and are brought into intimate contact. The upper part of the said tank C leads by a passage or pipe $f$ into the upper part of the second column B. The first column A has an escape passage or pipe $g$ for the steam and vaporous or gaseous products to the saturator (not shown) wherein is contained the acid or other matter; for example, sulphuric acid where the object is to form sulphate of ammonia, or water when concentrating gas liquors.

The first and second columns A and B are divided into chambers by the plates $a$ and $b$ each provided with central short pipes $a^2$ and $b^2$ for the steam to rise through from chamber to chamber and with trapped overflow pipes $a^3$, $b^3$ for the liquor to flow through down from chamber to chamber. The said short pipes $a^2$ $b^2$ are covered by hoods $h$ for causing the steam to pass through the liquors and these hoods are all fastened to a vertical shaft or rod $h^2$ passing down through both columns and mounted in bearings $h^3$, in which it can slide so that it with the hoods $h$ affixed to it can be lifted or lowered in order to vary the openings which the hoods present for the passage of the steam and gases, or so that the said rod and the said hoods can be raised and lowered by any suitable lifting and lowering apparatus and thus any obstruction can be cleared away or obstruction can be prevented.

I is a tubular heater through which the liquor passes by the pipe $j$ from a reservoir or other source of supply on its way to the first column A into which it enters by passing through the tubes of the heater and by the pipe or passage $k$ the said heater I being heated by the hot gases from the saturator entering by the pipe or passage $l$ and leaving it at $l^2$. The liquors thus passed into the first column A meet the steam rising direct through and then pass by the pipe $e$ into the lower part of the tank C into which the lime water or cream of lime or other agent is at the same time forced from the lime mixer R by means of the injector $d$ so that the liquors and the lime or the like are brought into intimate contact. The steam and gases pass by the passage or pipe $f$ from the top of the said tank C into the upper part of the second column B and thence ascend through the first column A on their way to the outlet from the first column to the saturator. The liquors overflow from the said tank C and pass by the pipe $p$ into the second column B into the lower part of which steam is admitted and this steam with the gases separated in this second column passes up through the first column also on its way to the outlet therefrom leading to the saturator. The liquors from which the volatile products have been expelled pass off by the outlet S.

The hoods $h$ are provided with serrated edges or openings near the edges thereof for the passage of the vapors and gases, the hoods of the first column A being preferably provided with small perforations or serrations and the hoods of the second column B with coarser perforations or serrations. The said hoods may be like those described in the specification of application, Serial No. 494,310, of even date herewith (corresponding to the said WALKER's British patent, No. 18,529, of November 19, 1889) and are so represented in the drawings; and in this event the shaft or rod $h^2$ can have only an endwise movement, for the purpose of preventing or clearing away obstructions; but they may be made of any other desired shape, as for example of the circular dished shape exhibited in Fig. 2 of the drawings and also in said WALKER's British patent, No. 16,806, of December 6, 1887, (on which this present application for a patent is based,) in which event the rod $h^2$ may be made capable of rotary, or continued rotary and endwise movement for the purpose last above referred to—what is essential being that through the rod movement for the purpose of adjustment, or for removing or preventing obstructions can be imparted conjointly to the hoods carried by it.

I do not limit myself to the precise relative positions of the vessels as shown. For example the vessel C and heater I and the lime mixer if desired may be placed on the top of the columns A and B to economize ground space or the vessel C may be placed between the columns A and B as aforesaid, in which case the vessel C may be without its coned lower part and communication between the columns A and B be established by a central pipe passing through the vessel C the pipes or passages being in any case arranged to fulfill their functions as hereinbefore described. Steam may be admitted to the still and vessel C by perforated steam coils if desired. The coils marked $x$ and $y$ are for this purpose.

I am aware that the use of two-column stills in combination with a vessel for lime for the purpose of distilling ammonia, the lime being agitated by a steam recoil wheel, is not new and I make no claim for such combination.

The whole of the sections of the still are shown as being secured together by bolts passing at top through the flange of the cover and at bottom through the base plate and secured by nuts so that the sections can be readily taken apart for cleaning and put together again afterward.

Having now particularly described and ascertained the nature of the said invention and in what manner the same is to be performed, I declare that what I claim is—

Apparatus for the purpose described consisting of the combination of a column superposed upon another column each column being divided into chambers and provided with short pipes or passages and hoods so that there is a continuous vertical passage for volatile constituents or vapors and gases up through both columns and through the liquid contained therein, a heater for the liquid and a communication therefrom to the first column and a tank or vessel for lime or other agent and a communication thereto for liquid from the lower part of the first column and a communication for lime treated liquid therefrom to the upper part of the second column and also a passage for vapors and gases from the said tank or vessel to one of the columns, all substantially as hereinbefore described.

In testimony whereof I, MARCELLUS BAILEY, administrator of the estate of WILLIAM THOMAS WALKER, deceased, hereunto set my hand this 21st day of December, 1893.

MARCELLUS BAILEY,
*Admr., &c.*

Witnesses:
EWELL A. DICK,
ROBT. W. COX.